US006601865B1

(12) United States Patent
Harper

(10) Patent No.: US 6,601,865 B1
(45) Date of Patent: Aug. 5, 2003

(54) VISUALLY APPEALING VERSATILE ROLLABLE AND FOLDABLE CHAIR

(76) Inventor: Sebert Harper, 78 E. 53rd St., Brooklyn, NY (US) 11203

( * ) Notice: Subject to any disclaimer, the term of this patent is extended or adjusted under 35 U.S.C. 154(b) by 0 days.

(21) Appl. No.: 10/154,660

(22) Filed: May 23, 2002

(51) Int. Cl.[7] .................................................. B62B 9/10

(52) U.S. Cl. .................. 280/304.1; 280/47.4; 280/642; 280/647; 297/188.06; 297/162; 297/183.9; 297/423.26

(58) Field of Search ....................... 297/184.16, 188.06, 297/188.02, 162, 183.9, 423.26; 280/304.1, 32.5, 638, 639, 642, 647, 650, 47.34, 47.38, 47.4

(56) References Cited

U.S. PATENT DOCUMENTS

| | | | | | |
|---|---|---|---|---|---|
| 1,001,240 | A | | 8/1911 | Beers | |
| 1,307,058 | A | | 6/1919 | McGrath | |
| 1,940,523 | A | | 12/1933 | Barclay | 155/30 |
| 2,596,055 | A | | 5/1952 | Thomas | 155/22 |
| 2,759,525 | A | | 8/1956 | Ries | 155/22 |
| 2,855,979 | A | | 10/1958 | Hubbard | 155/22 |
| 2,866,495 | A | | 12/1958 | Diehl et al. | 155/22 |
| RE24,817 | E | | 4/1960 | Hogan | 155/23 |
| 3,398,974 | A | | 8/1968 | Edwards et al. | 280/289 |
| 3,405,954 | A | | 10/1968 | Wolfe | 280/289 |
| 3,987,807 | A | * | 10/1976 | Varnell | 135/66 |
| 4,229,039 | A | | 10/1980 | Day | 297/232 |
| 4,759,562 | A | | 7/1988 | Vinyard et al. | 280/289 |
| 4,848,833 | A | * | 7/1989 | Grall | 297/162 |
| 4,861,051 | A | | 8/1989 | Napper | 280/87 |
| 5,060,967 | A | * | 10/1991 | Hulterstrum | 280/650 |
| 5,294,141 | A | | 3/1994 | Mentessi et al. | 280/250 |
| 5,299,824 | A | * | 4/1994 | Roberts et al. | 280/304.1 |
| 5,320,122 | A | | 6/1994 | Jacobson, II et al. | 135/66 |
| 5,328,183 | A | | 7/1994 | Counts | 280/42 |
| 5,358,263 | A | * | 10/1994 | Aldus et al. | 280/42 |
| 5,419,571 | A | | 5/1995 | Vaughan | 280/250 |
| 5,451,193 | A | | 9/1995 | Pickard | 482/68 |
| 5,558,358 | A | | 9/1996 | Johnson | 280/648 |
| 5,605,345 | A | | 2/1997 | Erfurth et al. | 280/250 |
| 6,099,002 | A | | 8/2000 | Uchiyama | 280/87 |
| 6,161,860 | A | | 12/2000 | Corneau | 280/642 |
| 6,311,708 | B1 | | 11/2001 | Howle | 135/67 |
| 6,318,392 | B1 | | 11/2001 | Chen | 135/67 |
| 6,338,355 | B1 | | 1/2002 | Cheng | 135/67 |
| 6,338,493 | B1 | | 1/2002 | Wohlgemuth et al. | 280/30 |
| 6,343,802 | B1 | | 2/2002 | Workman et al. | 280/87 |
| 6,345,833 | B2 | * | 2/2002 | Melgarejo et al. | 280/250.1 |
| 6,443,252 | B1 | * | 9/2002 | Andes | 180/65.1 |
| 6,520,513 | B2 | * | 2/2003 | Presley-Mays | 280/32.5 |

* cited by examiner

*Primary Examiner*—Brian L. Johnson
*Assistant Examiner*—Brian Swenson
(74) *Attorney, Agent, or Firm*—Steven Horowitz

(57) ABSTRACT

A visually appealing rollable, collapsible chair comprising a cushioned seat, stability handles projecting outwardly from opposite sides of the seat and being foldable under the seat, wheeled front and rear legs, a seat back including a continuous upside down u-shaped rod and a seat back cushion, a pair of handle bars for pushing the occupant while seated, a substantially rectangular leg rest spanning the width of the chair and supported by a fifth wheel, a cane holder, a net and a removable arm rest assembly comprising a substantially flat arm rest having a clip on a bottom thereof, an L-shaped bar made of a short side, a long side and a vertical side perpendicular to the short side, the bottom of the arm rest clipping and resting on the long side of the L-shaped bar, the arm rest including a larger portion that is foldable upwardly for drawing.

11 Claims, 4 Drawing Sheets

VISUALLY APPEALING VERSATILE ROLLABLE AND FOLDABLE CHAIR

FIELD OF THE INVENTION

The field of this invention is movable chairs, and in particular movable chairs for individuals who need to avoid standing for large periods of time in situations like waiting on line.

BACKGROUND OF THE INVENTION AND DISCUSSION OF THE PRIOR ART

A range of devices are available to adults whose mobility is impaired, whether because of age, injury, illness etc. These devices are suitable for individuals having varying degrees of coordination, strength and endurance. The simplest devices are canes, providing a single additional point of support. Some canes use multiple tips for increased stability. The rehabilitative crutch can be grouped together with the canes. Finally, the cane is expanded into an adult walker, which surrounds the user by a light weight frame. The frame is lifter off the ground and moved forward by the user.

To eliminate the need for lifting a walker frame off the ground wheels are added. A two-wheeled version has wheels on the front pair of legs and feet on the back pair and is moved forward by tilting the walker forward. For additional mobility all four legs can have wheels, but now brakes are needed.

Walkers and canes serve a user with sufficient leg strength to stand erect, providing extra stability or transferring weight off a weak leg. Wheelchairs are for users who have essentially no usable leg strength. The wheelchair is a rolling seat designed for individuals unable to stand and is moved by gripping circumferential hand grips inside the rims of large rear wheels or by an attendant standing behind the wheelchair and grasping handles for that purpose. Wheelchairs are not the device of choice for individuals who merely cannot stand for long periods of time because they may not want to look very sick.

Individuals who have sufficient strength to walk with the aid of a supporting device may still be incapable of standing for long periods of time. One solution is the cane-seat, a small stool attached to a walking cane. The rigid four-footed walker may also be equipped with a seat. A more recent species of mobility aid is known as a "rollator". It has four legs, four wheels, a seat, brakes, and sometimes a basket. The rollator may be used as a rolling walker, and also serves as a portable seat. The user of a rollator may propel himself while seated by applying his feet to the floor, similar to what a person seated on an office chair does when he wants to move across the room.

The present invention including a folding seat, four wheels and an extensible safety handle on either side of the seat, making it better adapted than the rollator for seated pedal propulsion. Other features, such as handle bars and a one-piece foot rest make the chair of the present invention better suited for being pushed by an attendant than a rollator. The chair of the present invention can also function as a rolling walker, where the user walks forward with the chair as a support, something a wheelchair cannot do.

SUMMARY OF THE PRESENT INVENTION

A visually appealing rollable, collapsible chair comprising a cushioned seat, stability handles projecting outwardly from opposite sides of the seat and being foldable under the seat, wheeled front and rear legs, a seat back including a continuous upside down u-shaped rod and a seat back cushion, a pair of handle bars for pushing the occupant while seated, a substantially rectangular leg rest spanning the width of the chair and supported by a fifth wheel, a cane holder, a net and a removable arm rest assembly comprising a substantially flat arm rest having a clip on a bottom thereof, an L-shaped bar made of a short side, a long side and a vertical side perpendicular to the short side, the bottom of the arm rest clipping and resting on the long side of the L-shaped bar, the arm rest including a larger portion that is foldable upwardly for drawing.

Important Objects and Advantages

The following important objects and advantages of the present invention are:

(1) to provide a chair that elderly, injured or infirm can sit on that does not look like a wheelchair;

(2) to provide a mobility aid that combines the functions of a walker, a rollator and a wheelchair while maintaining light weight and foldability;

(3) to provide a chair as described in objective (2) that also holds and makes available to the seated occupant other important features like a cane and either an arm rest or an umbrella.

(4) to provide an aesthetically appealing chair that can be used while waiting on line at an airport, theme parks and other public place;

(5) to provide a foldable chair that can be stored and either wheeled around or carried around for whenever needed thus allowing a resident of a nursing home to park it;

(6) to provide a chair that can be moved forward by the simple motion of the legs of a seated occupant;

(7) to provide a chair that has a leg rest that permits the occupant's legs to rest in a manner that does not interfere with forward motion when the occupant is being pushed;

(8) to provide a chair that has a stable leg rest as a result of a fifth wheel attached to the leg rest;

(9) to provide a movable chair with lockable front wheels;

(10) to provide a versatile chair that offers an elderly or other person mobility while waiting on a line and that includes a cane holder;

(11) to provide such a movable chair that has an arm rest assembly so that the seated occupant can read or do productive work while waiting;

(12) to provide a chair with an arm rest assembly including an arm rest whose larger portion can be lifted to an "up" position for resting a board or other work material against; and

(13) to provide a chair with a guide that can alternately receive either an arm rest assembly or an umbrella suitable for outdoor use;

(14) to provide a movable chair that includes stability handles projecting outwardly from opposite sides of the seat to prevent the seated occupant from slipping off when moving forward using one's legs, the handles being foldable under the seat when not needed or when the chair is stored;

(15) to provide a movable chair that moves forward or backward just with the power of the seated occupant that can be used for gardening, waiting on line and any other activity;

(16) to provide a movable chair that allows someone to sit and still be able to move around without looking like a sick person since the chair does not look like a wheelchair; and

(17) to provide a movable chair that can is designed for convenient assistance by a third party such as a attendant.

DETAILED DESCRIPTION OF THE PREFERRED EMBODIMENT

Figure 1:
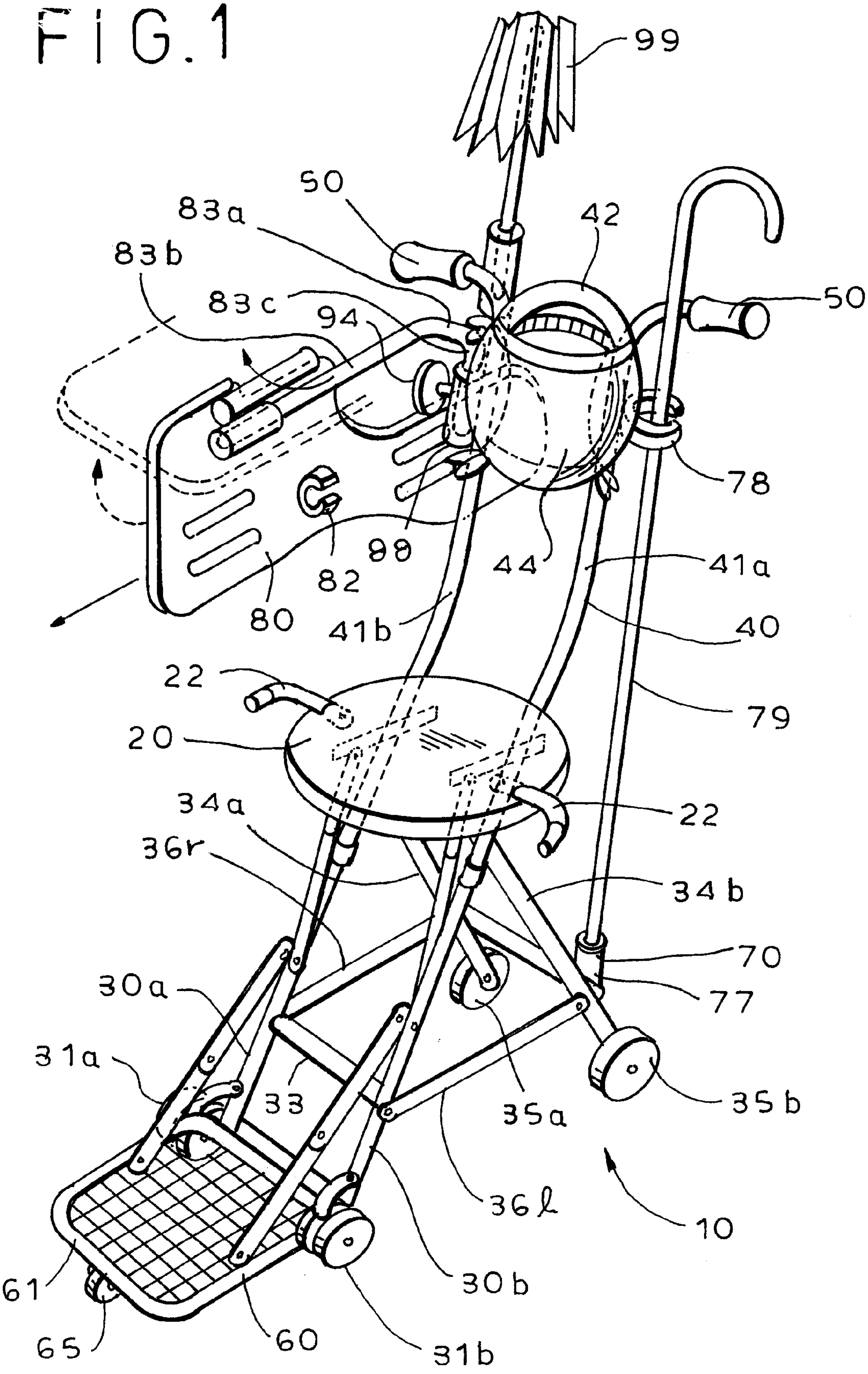
FIG. 1 is a perspective view of the chair of the present invention.

The apparatus of the present invention will now be illustrated by reference to the accompanying drawings. The chair of the present invention has been assigned reference numeral 10. Other elements have been assigned the reference numerals referred to below.

Chair 10 is useful for anyone who needs to sit rather than stand yet needs to have mobility at the same time without looking like a "sick" person.

As seen from FIGS. 1–5, a sleek, visually appealing, versatile, rollable, collapsible chair 10 is shown for sitting and moving while waiting on a line in an airport, an amusement park or any other similar situation. Chair 10 is comprised of a cushioned seat 20. Cushioned seat 20 is in a preferred embodiment circular to achieve a sleek appearance.

Stability handles 22 project outwardly from opposite sides of the seat 20 in a plane that the seat 20 lies in. Stability handles 22 can be folded under the seat 20. The purpose of handles 22 is so that when the occupant uses is or her legs to roll forward, he or she will not slip off. Two front legs 30*a*, 30*b* each of which has a lockable front wheel 31*a*, 31*b* attached to a bottom of the legs, 30*a*, 30*b*. Front legs 30*a*, 30*b* are connected to one another by a front horizontal bar 33. Chair 10 also includes two rear legs 34*a*, 34*b* each of which has a rear wheel 35*a*, 35*b* attached to a bottom thereof, the rear legs 35 are connected by rear horizontal bar 37.

Seat back 40 includes a continuous upside down u-shaped rod made of right and left I-shaped rods 41*a*, 41*b* that has a curved bridge rod 42. Seat back 40 also includes seat back cushion 44 crossing the I-shaped rods 41*a*, 41*b* at an upper portion thereof. A pair of handle bars 50 for pushing a seated occupant of the chair 10, each handle bar 50 projecting from a point at which an I-shaped rod 41 meets an end of the bridge rod 42. Handles bars 50 project perpendicularly to a direction of the I-shaped rods 41. One important feature of handle bars 50 is that they are at a height that is convenient for an attendant. An attendant can push a seated occupant of chair 10 conveniently and without interfering with the comfort of the seated occupant. This is not the case when the mobility aid has a lower set of handles.

Figure 2:
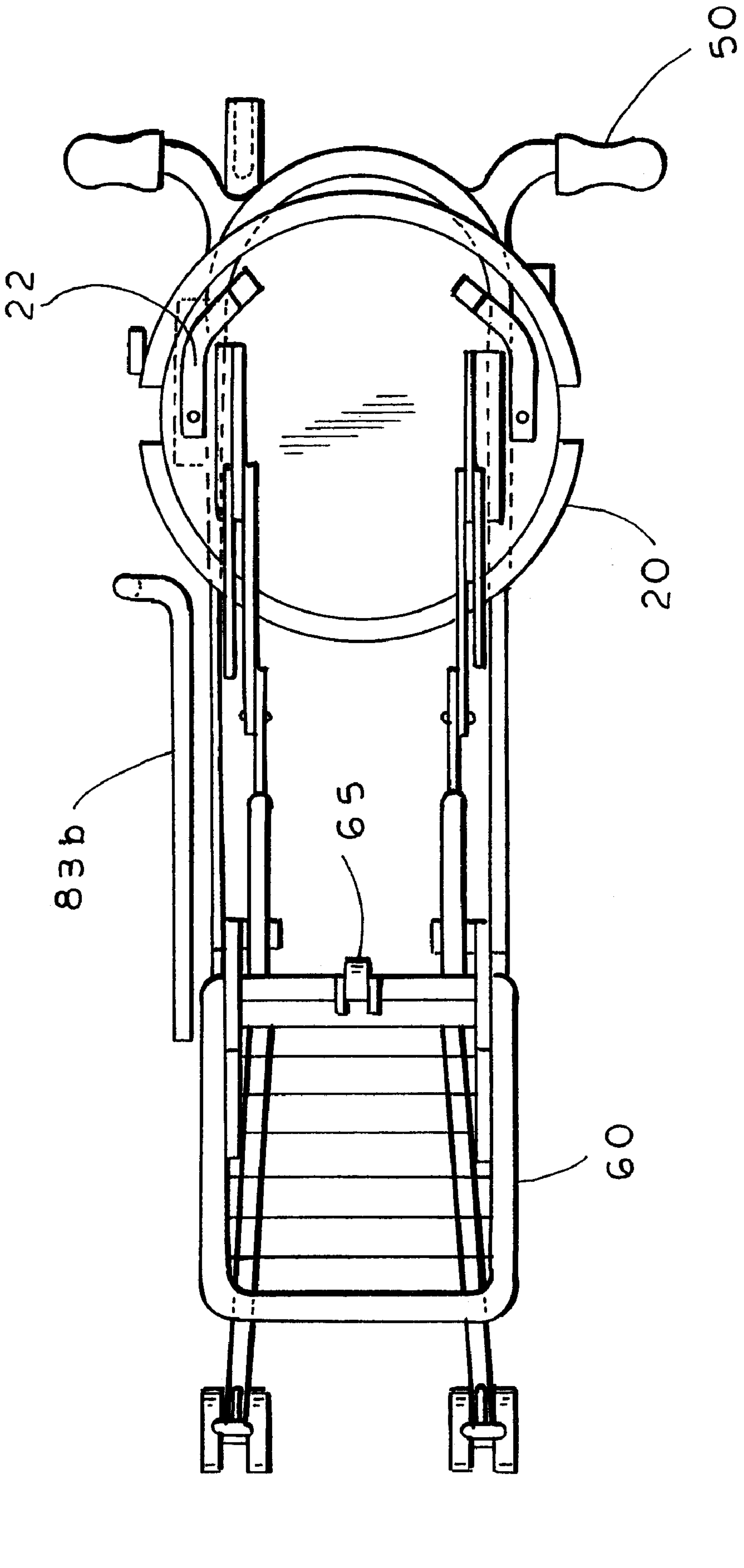
FIG. 2 is a front view of the chair of the present invention in a stored position.
Figure 3:
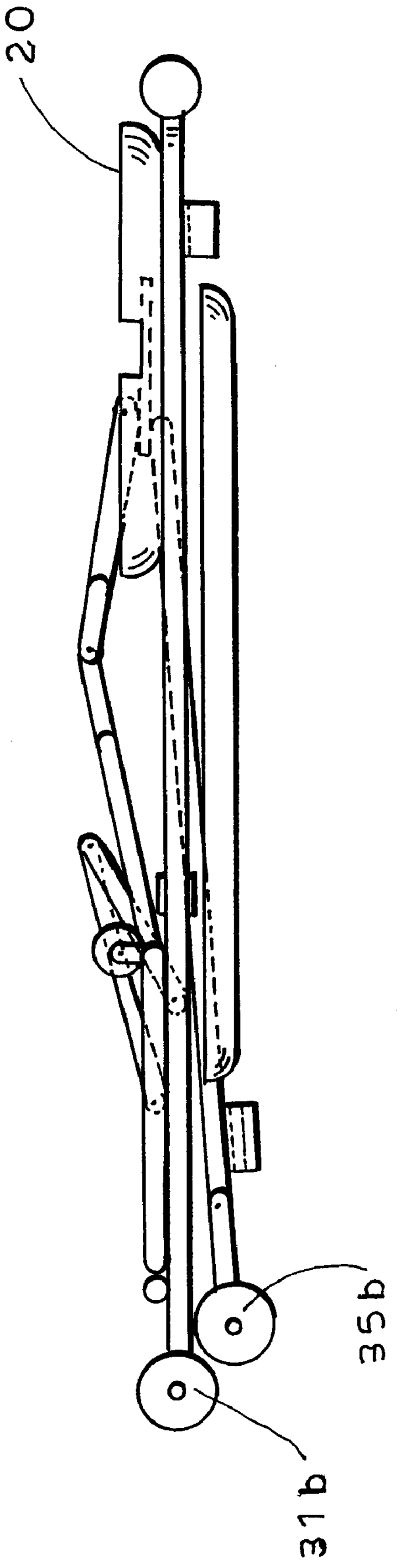
FIG. 3 is a side elevation view of a chair of the present invention in a stored position.

Chair 10 can be collapsed in a folded position for storage. In folded position chair 10 can easily be wheeled along on the rear wheels 35*a*, 35*b*. Seat 20 and front legs 30*a*, 30*b* are foldable upwardly so as to fit in folded position against the seat back 40 and the rear legs 34*a*, 34*b*. Chair 10 folds into a narrow shape for storage and for being moved, as best seen in FIGS. 2–3.

A pair of crossbars 36*l*, 36*r* connecting a front leg 30*a* and rear leg 34*a* on each side (also front leg 30*b* to rear leg 34*b*). Crossbars 36*l*, 36*r* lie in a plane with the front horizontal bar 33 and rear horizontal bar 37. Crossbars 36*l*, 36*r* are foldable by pivoting on rear legs 34*a*, 34*b*.

A one-piece substantially rectangular leg rest 60 substantially spans the width of the chair and the seat 20 and is parallel to the seat 20. Leg rest 60 projects forwardly from the front horizontal bar 33. Leg rest 60 includes a front bar 61 that supports an attached fifth wheel 65 for stability so that a person facing chair 10 cannot step on leg rest 60 and thereby accidentally force the top of chair 10 forward causing injury.

Leg rest 60 is of one piece to avoid the drawbacks of the two legs rest? one for each leg. The two leg rest feature suffers from the problem that a gap between the two leg rests allows the feet to drop accidentally when a bump is encountered while moving forward. The dropping of one or more legs in this situation can be bothersome or even dangerous.

For further convenience to the elderly or any other persons who use a cane, a cane holder 70 is provided. Cane holder 70 comprises two parts. The first part is a rotatable female socket 77 projecting upwardly from a side of the rear horizontal bar 37 for receiving a lower part of a cane 79. The second part is a cane clip 78 for holding an upper part of cane 79, the cane clip 78 connected to the left I-shaped rod 41a at the same or similar height as the seat back cushion 44 near or adjacent the seat back cushion 44. Cane clip 78 typically although not necessarily is of the type that is substantially annular and that can be forced open by pressing the cane between and against a pair of opposing curved ends of the cane clip 78 to force it in.

Chair 10 comes with or without cane 79. In embodiments where cane 79 comes with chair 10, cane 79 includes markings on it so that the seated occupant to measure things while seated for activities that require it. For example when gardening it is necessary to measure the distance to place the seedlings.

Figure 4:
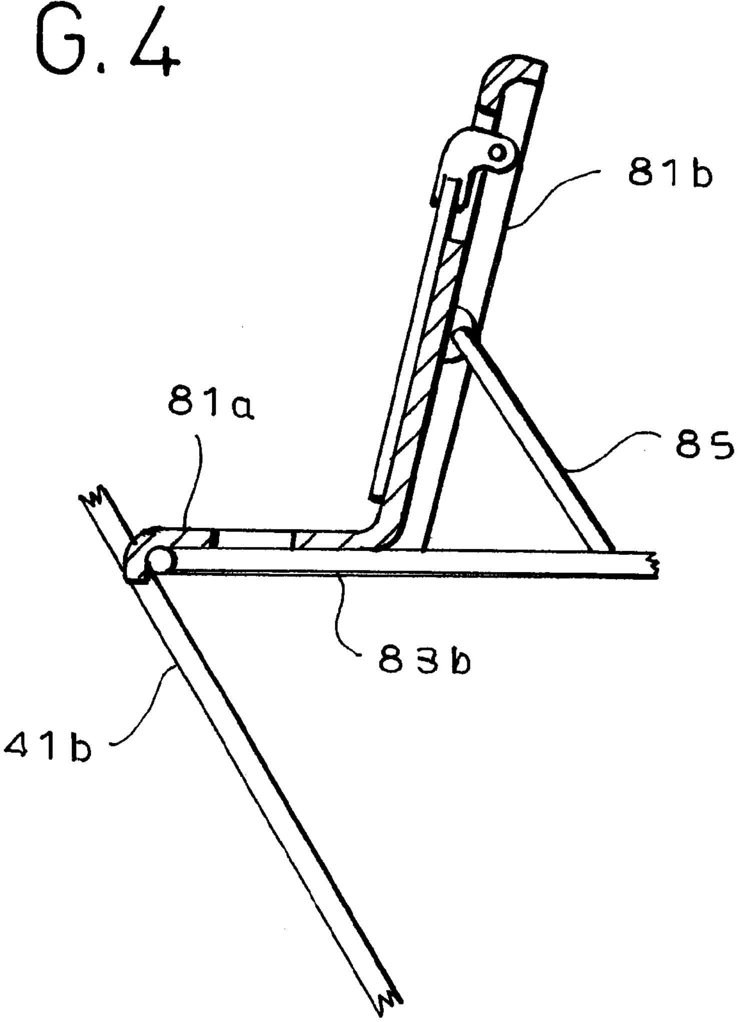
FIG. 4 is a side view partly broken away of the arm rest of the chair of the present invention in an "up" position.
Figure 5:
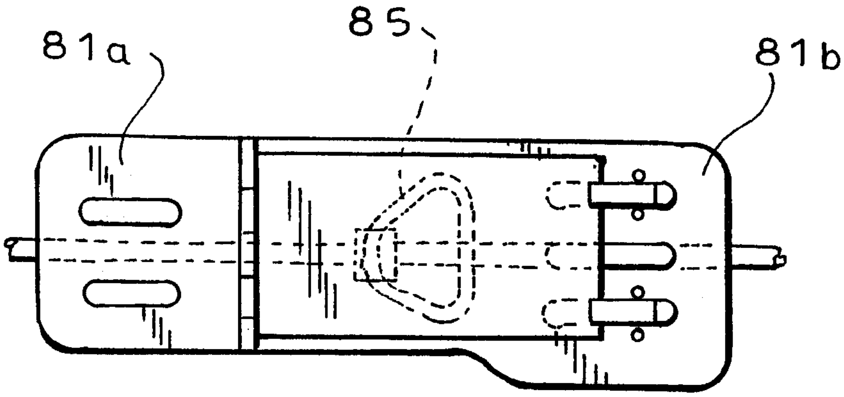
FIG. 5 is a top plan view of the arm rest of the chair of the present invention in a "down" position.

One advantage of cane holder 70 and cane 79 is an elderly or injured or infirm person can use restrooms more independently than with other wheeled chairs such as a wheelchair. Wheelchairs cannot generally enter a bathroom not designed specifically for such use. With chair 10, the nursing home patient or any other user of chair 10, can travel independently to the restroom, park chair 10 outside the restroom, remove cane 79 from cane holder 70 and walk into the bathroom assisted by cane 79 and then return to the chair 10 and move from the bath A removable arm rest assembly 80 includes a substantially flat arm rest 81 having an arm rest clip 82 on a bottom 82*a* thereof, an L-shaped bar 83 made of a short side 83*a*, a long side 83*b* and a vertical side 83*c* perpendicular to the short side 83*a*. Bottom 82*a* of arm rest 81 clips to the long side 83*b* of L-shaped bar 83 so that bottom 82*a* rests on the long side 83*b* of the L-shaped bar 83 when arm rest 81 is in position to be used to rest an arm or a book or anything else. Hollow guide 88 projects from the right I-shaped rod 41*b* and receives and supports the vertical side 83*c* of L-shaped bar 83. In stored position arm rest 81 simply hangs from the long side 83*b* of the L-shaped bar 83 by any well known means. Chair 10 is also provided with a net 90 that is attached to the seat back 40 adjacent the seat back cushion 44 for holding things such as personal items. FIG. 2, which shows a front view of chair 10 folded so that it can be stored, has long side 83*b* of bar 83 disconnected from the rest of chair 10 since it is being stored In one embodiment, arm rest 81 includes a smaller portion 81 a that remains flat and a larger portion 81*b* that is foldable upwardly so that working material can be rested against the larger portion 81*b*. This is most useful for reading or drawing, activities that are often engaged in by elderly individuals for recreation. Any well known means can be used to adjoin smaller portion 81 a with larger portion 81*b* in a foldable relation. Furthermore, depending upon what means is used to fold the two portions, larger portion 81*b* is also held in its upward position by any suitable well known means. That may include a brace 85 running from larger portion 81*b* and attaching to grooves (not shown) in long side 83*b* of L-shaped bar 83, as best seen in FIG. 4. It should be noted that the brace 85 of FIG. 5 looks shorter than the brace 85 depicted in FIG. 4. They are not necessarily intended to be consistent. It is contemplated by the present invention that in a different version, larger portion 81*b* can simply stay in the up position by tension at the connection point between larger portion 81*b* and smaller portion 81*a*.

Arm rest assembly 80 is very useful for a person who is waiting on line and who wants to use his or her time effectively in the meantime. Arm rest assembly 80 allows such a person to read, draw or do anything else while waiting. Arm rest assembly 80 is also particularly useful for disabled students who have to be wheeled around in a wheelchair to a desk. Using chair 10, these students can wheel themselves to their seat and be ready to function in the classroom.

Hollow guide 88 is also designed in shape so that it can also support and receive a trunk of an umbrella 99. Although FIG. 1 shows an umbrella 99 and arm rest assembly 80, these are alternative items to be placed in hollow guide 88. A screw or knob 94 tightens or loosens whatever is inside hollow guide 88, for example, vertical side 83*c* of arm rest assembly 80 when arm rest assembly 80 is being used or the trunk of the umbrella 99 when the umbrella 99 is received in hollow guide 88.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof It is not desired to limit the invention to the exact construction and operation shown and described. The spirit and scope of this invention are limited only by the spirit and scope of the following claims.

What is claimed is:

1. A visually appealing, versatile, rollable, collapsible chair for sitting and moving, comprising:

a cushioned seat, stability handles projecting outwardly from opposite sides of the seat, said handles being foldable under the seat, two front legs each of which has a lockable front wheel attached to a bottom thereof, the front legs being connected to one another by a front horizontal bar, two rear legs each of which has a wheel attached to a bottom thereof, the rear legs being connected by a rear horizontal bar, a seat back including a continuous upside down u-shaped rod made of right and left I-shaped rods and a curved bridge rod and including a seat back cushion crossing the I-shaped rods at an upper portion thereof, a pair of handle bars for pushing a seated occupant of the chair, each handle bar at a point at which an I-shaped rod meets an end of the bridge rod projecting perpendicularly to a direction of the I-shaped rods the seat and front legs foldable upwardly so as to fit in folded position against the seat back and the rear legs, a pair of crossbars connecting a front and rear leg on each side, the crossbars lying in a plane with the front and rear horizontal bars, the crossbars foldable by pivoting on the rear legs, a one-piece substantially rectangular leg rest substantially spanning the width of the chair and projecting forwardly from the front horizontal bar, the leg rest including a front bar that supports an attached fifth wheel for stability, a cane holder comprising a rotatable female socket projecting upwardly from a side of the rear horizontal bar for receiving a lower part of a cane and a cane clip for holding an upper part of a cane, the cane clip connected to the left I-shaped rod at a height of [adjacent] the seat back cushion; and a removable arm rest assembly comprising a substantially flat arm rest having a clip on a bottom thereof, an L-shaped bar made of a short side, a long side and a vertical side perpendicular to the short side, the bottom of the arm rest clipping and resting on the long side of the L-shaped bar, a hollow guide projecting from the right I-shaped rod receiving and supporting the L-shaped bar, the arm rest in stored position hanging from the long side of the L-shaped bar.

2. The chair of claim 1, wherein the arm rest includes a smaller portion that remains flat and a larger portion that is foldable upwardly so that working material can be rested against said larger portion.

3. The chair of claim 1, wherein said cane holder has attached thereto a cane having markings thereon for measuring distances.

4. The chair of claim 1, wherein the arm rest includes a smaller portion that remains flat and a larger portion that is foldable upwardly so that working material can be rested against said larger portion and wherein the cane holder has attached thereto a cane having markings thereon for measuring distance.

5. The chair of claim 1, wherein the arm rest includes a smaller portion that remains flat and a larger portion that is foldable upwardly so that working material can be rested against said larger portion, wherein the cane holder has attached thereto a cane having markings thereon for measuring distance and wherein a net is attached to the seat back adjacent the seat back cushion for holding personal items.

6. The chair of claim 1, wherein the hollow guide can support and receive a trunk of an umbrella.

7. The chair of claim 1, wherein the cane clip is of a type that is substantially annular and that can be forced open by pressing the cane against a pair of opposing curved ends of the cane clip.

8. The chair of claim 1, wherein the seat is circular.

9. The chair of claim 1, wherein a net is attached to the seat back adjacent the seat back cushion for holding personal items.

10. The chair of claim 1, wherein the leg rest is parallel to the seat.

11. The chair of claim 1, wherein the stability handles lie in a plane that the seat lies in.

* * * * *